(12) United States Patent
Nordstrom (10) Patent No.: US 9,311,363 B1
(45) Date of Patent: Apr. 12, 2016

(54) PERSONALIZED ENTITY RANKINGS

(71) Applicant: Google Inc., Mountain View, CA (US)

(72) Inventor: Paul G. Nordstrom, Seattle, WA (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 13/894,916

(22) Filed: May 15, 2013

(51) Int. Cl.
*G06F 17/30* (2006.01)

(52) U.S. Cl.
CPC ................ *G06F 17/3053* (2013.01)

(58) Field of Classification Search
CPC .................................................. G06F 17/3053
See application file for complete search history.

(56) References Cited

U.S. PATENT DOCUMENTS

| | | | | |
|---|---|---|---|---|
| 6,963,848 | B1* | 11/2005 | Brinkerhoff | 705/7.32 |
| 7,949,659 | B2* | 5/2011 | Chakrabarti et al. | 707/732 |
| 9,223,831 | B2* | 12/2015 | Baker | G06F 17/3053 |
| 2006/0129446 | A1* | 6/2006 | Ruhl et al. | 705/10 |
| 2006/0143066 | A1* | 6/2006 | Calabria | G06F 17/30867 705/7.29 |
| 2009/0048823 | A1* | 2/2009 | Liu et al. | 704/9 |
| 2009/0193011 | A1* | 7/2009 | Blair-Goldensohn et al. | 707/5 |
| 2010/0125484 | A1* | 5/2010 | Chen et al. | 705/10 |
| 2011/0113041 | A1* | 5/2011 | Hawthorne et al. | 707/749 |
| 2011/0145219 | A1* | 6/2011 | Cierniak | G06F 17/30867 707/709 |
| 2011/0251973 | A1* | 10/2011 | Chen et al. | 705/347 |
| 2012/0016764 | A1* | 1/2012 | Ouimet | 705/26.7 |
| 2013/0117329 | A1* | 5/2013 | Bank et al. | 707/803 |
| 2014/0188897 | A1* | 7/2014 | Baker | G06Q 30/0631 707/748 |

OTHER PUBLICATIONS

Yukawa, T., et al., "An Expert Recommendation System using Concept-based Relevance Discernment," International Conference on Tools with Artificial Intelligence—ICTAI, 2001, 8 pages.
O'Connor, M., et al., "PolyLens: A Recommender System for Groups of Users," Proceedings of the Seventh European Conference on Computer-Supported Cooperative Work, Sep. 16-20, 2001, pp. 199-218.
Roth-Berghofer, T.R., "Revealing the Magic of Product Recommendation," in: ECAI Patras 2008, 18th European Conference on Artificial Intelligence, Proceedings 'Workshop on Recommender Systems,' Jul. 22, 2008, Zanker, M., et al., 1 page.
Radde, S., et al., "A Model-Based Customer Inference Engine," in: ECAI Patras 2008, 18th European Conference on Artificial Intelligence, Proceedings 'Workshop on Recommender Systems,' Jul. 22, 2008, Zanker, M., et al., 6 pages.
Zanardi, V., et al., "Social Ranking: Finding Relevant Content in Web 2.0," in: ECAI Patras 2008, 18th European Conference on Artificial Intelligence, Proceedings 'Workshop on Recommender Systems,' Jul. 22, 2008, Zanker, M., et al., 6 pages.

(Continued)

*Primary Examiner* — Richard Bowen
(74) *Attorney, Agent, or Firm* — Fish & Richardson P.C.

(57) ABSTRACT

Methods, systems, and apparatus, including computer programs encoded on a computer storage medium, for providing personalized evaluations of products, services, or providers are disclosed. In one aspect, a method includes obtaining, for an entity, quality feedback including quality scores representing measures of quality for the entity and including feedback text submitted with the quality scores. A characteristic of the entity is identified from the feedback text, and an influence of the characteristic on the quality scores is determined. A quality profile specifying a measure of importance of the characteristic to the user is identified. An estimated quality value for the entity is determined based on the influence of the characteristic and the characteristic weight, and the entity is ranked based on the estimated quality score.

17 Claims, 4 Drawing Sheets

(56) References Cited

OTHER PUBLICATIONS

Tintarev, N., et al., "Over- and underestimation in different product domains," in: ECAI Patras 2008, 18th European Conference on Artificial Intelligence, Proceedings 'Workshop on Recommender Systems,' Jul. 22, 2008, Zanker, M., et al., 6 pages.

de Spindler, A., et al., "Harnessing Facebook for the Evaluation of Recommender Systems based on Physical Copresence," in: ECAI Patras 2008, 18th European Conference on Artificial Intelligence, Proceedings 'Workshop on Recommender Systems,' Jul. 22, 2008, Zanker, M., et al., 6 pages.

Ampazis, N., "Collaborative Filtering via Concept Decomposition on the Netflix Dataset," in: ECAI Patras 2008, 18th European Conference on Artificial Intelligence, Proceedings 'Workshop on Recommender Systems,' Jul. 22, 2008, Zanker, M., et al., pp. 26-30.

Ray, S., et al., "Filler Items Strategies for Effective Shilling Attacks," in: ECAI Patras 2008, 18th European Conference on Artificial Intelligence, Proceedings 'Workshop on Recommender Systems,' Jul. 22, 2008, Zanker, M., et al., pp. 31-34.

Kunegis, J., et al., "On the Scalability of Graph Kernels Applied to Collaborative Recommenders," in: ECAI Patras 2008, 18th European Conference on Artificial Intelligence, Proceedings 'Workshop on Recommender Systems,' Jul. 22, 2008, Zanker, M., et al., 4 pages.

Rebelo, C., et al., "Empirical Evaluation of Ranking Trees on the Problem of Recommending Learning Algorithms," in: ECAI Patras 2008, 18th European Conference on Artificial Intelligence, Proceedings 'Workshop on Recommender Systems,' Jul. 22, 2008, Zanker, M., et al., 6 pages.

Santos, O.C., et al., "Recommender Systems for Lifelong Learning inclusive scenarios," in: ECAI Patras 2008, 18th European Conference on Artificial Intelligence, Proceedings 'Workshop on Recommender Systems,' Jul. 22, 2008, Zanker, M., et al., 4 pages.

Kang, Y., et al., "Help-Desk Agent Recommendation System Based on Three-Layered User Profile," in: ECAI Patras 2008, 18th European Conference on Artificial Intelligence, Proceedings 'Workshop on Recommender Systems,' Jul. 22, 2008, Zanker, M., et al., 4 pages.

Petry, H., et al., "ICARE: A Context-Sensitive Expert Recommendation System," in: ECAI Patras 2008, 18th European Conference on Artificial Intelligence, Proceedings 'Workshop on Recommender Systems,' Jul. 22, 2008, Zanker, M., et al., pp. 53-58.

Manouselis, N., "A Discussion on Multi-Criteria Recommendation," in: ECAI Patras 2008, 18th European Conference on Artificial Intelligence, Proceedings 'Workshop on Recommender Systems,' Jul. 22, 2008, Zanker, M., et al., 2 pages.

Draxler, S., et al., "Plug-in recommending for Eclipse users," in: ECAI Patras 2008, 18th European Conference on Artificial Intelligence, Proceedings 'Workshop on Recommender Systems,' Jul. 22, 2008, Zanker, M., et al., 2 pages.

Narayanan, T., et al., "Exploring the Support for Spoken Natural Language Explanations in Inference Web," in: ECAI Patras 2008, 18th European Conference on Artificial Intelligence, Proceedings 'Workshop on Recommender Systems,' Jul. 22, 2008, Zanker, M., et al., pp. 63-64.

Sarwar, B., et al., "Item-Based Collaborative Filtering Recommendation Algorithms," WWW10, ACM. (online), May 1-5, 2001 [Retrieved on Feb. 26, 2013]. Retrieved from the internet: http://www.grouplens.org/papers/pdf/www10_sarwar.pdf, 11 pages.

McDonald D.W., et al., "Expertise Recommender: A Flexible Recommendation System and Architecture," CSCW '00, ACM (online), Dec. 2-6, 2000 [Retrieved on Feb. 26, 2013]. Retrieved from the internet: http://courses.ischool.utexas.edu/donturn/2008/fall/INF_385Q/readings/McDonald_Ackerman-2000-Expert.pdf, pp. 231-240.

Cho, Y.H. et al., "A personalized recommended system based on web usage mining and decision tree induction." Expert Systems with applications 23 (2002) 329-342.

* cited by examiner

PERSONALIZED ENTITY RANKINGS

BACKGROUND

This specification relates to data processing and evaluating products, services, or providers. This specification relates to data processing and content distribution.

The Internet facilitates exchange of information between users across the globe. This exchange of information enables service providers to provide services to users that are not located in the same geographic regions as the service provider. Similarly, users that are interested in obtaining services over the Internet can identify service providers without limiting their search to local service providers.

SUMMARY

In general, one innovative aspect of the subject matter described in this specification can be embodied in methods that include the actions of obtaining, for an entity and from the data store, quality feedback including quality scores representing measures of quality for the entity and including feedback text submitted with the quality scores; identifying, from the feedback text, a characteristic of the entity; determining an influence of the characteristic on the quality scores; identifying, for a user, a quality profile specifying a characteristic weight that is a measure of importance of the characteristic to the user; determining, for the user, an estimated quality value for the entity based on the influence of the characteristic on the quality scores and the characteristic weight for the user; and ranking, for the user, the entity among other entities based on the estimated quality score. Other embodiments of this aspect include corresponding systems, apparatus, and computer programs, configured to perform the actions of the methods, encoded on computer storage devices.

These and other embodiments can each optionally include one or more of the following features. Obtaining quality feedback can include obtaining, from each of multiple different users that have experienced an interactive session, a quality score for the interactive session and feedback text including comments supplied by the different users. Identifying a characteristic of the entity can include identifying a topic referenced by feedback text submitted by one or more of the multiple different users. Identifying a quality profile can include identifying user quality feedback previously received from the user; and determining, based on the user quality feedback, a difference between quality scores that were associated with the characteristic and quality scores that were not associated with the characteristic.

Determining an influence of the characteristic on the quality scores can include determining a difference between first quality scores received with text identifying the characteristic and second quality scores received without text identifying the characteristic; and determining the influence of the characteristic based on the difference between the first quality scores and the second quality scores.

Identifying a quality profile for the user can include obtaining previous quality feedback previously received from the user; identifying a characteristic referenced by feedback text in the previous quality feedback received from the user; identifying first quality scores that were received in a portion of the previous quality feedback that includes the feedback text that references the characteristic; identifying second quality scores that were received in a portion of the previous quality feedback that does not include the feedback text that references the characteristic; and determining the characteristic weight for the user based on a difference between the first quality scores and the second quality scores.

Methods can include generating the quality profile based on the characteristic weight of the characteristic for the user and at least one additional characteristic weight of at least one additional characteristic for the user.

Identifying a quality profile can include identifying a user-specified measure of importance of the characteristic. Determining, for the user, an estimated quality score for the entity based on the influence of the characteristic on the quality scores and the characteristic weight for the user can include determining that the characteristic weight for the user indicates that the characteristic is important to the user; determining that the influence of the characteristic on the quality scores is a positive influence; and increasing a baseline quality score for the entity based, at least in part, on a magnitude of the positive influence.

Particular embodiments of the subject matter described in this specification can be implemented so as to realize one or more of the following advantages. A particular user can be provided personalized quality scores that are computed to account for the particular user's perception of quality. For example, the characteristics that are important to the particular user for evaluating quality can be identified and utilized to adjust quality ratings provided by other users that may evaluate quality using different characteristics than the particular user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A personalized quality score is provided to a user based on a quality profile for the user, quality scores for an entity, and an effect of one or more characteristics on the quality scores for the entity. For example, assume that the overall (e.g., average) quality score for a particular service provider is 3.0 out of a highest possible value of 5.0, but that the average quality score submitted by users that mentioned price in feedback comments is 2.0. In this example, the overall quality score may fail to provide a particular user that is uninterested in price a useful measure of quality from that user's perspective. The quality score can be adjusted to account for the negative influence price (e.g., the negative influence of the quality scores associated with feedback comments mentioning price), and the adjusted quality score can be provided to the particular user as a personalized quality score. For example, upon determining that price is of little interest to the particular user (e.g., based on a quality profile for the user or other information provided by the user), the negative influence of price can be reduced, thereby increasing the quality score that is provided to that particular user. Similar adjustments to the quality score can be made with respect to other characteristics associated with the service provider to arrive at an estimated quality score for the service provider from the perspective of the particular user. The personalized quality scores described throughout this document can be generated with respect to any entity (i.e., a person, place, or thing).

Figure 1:
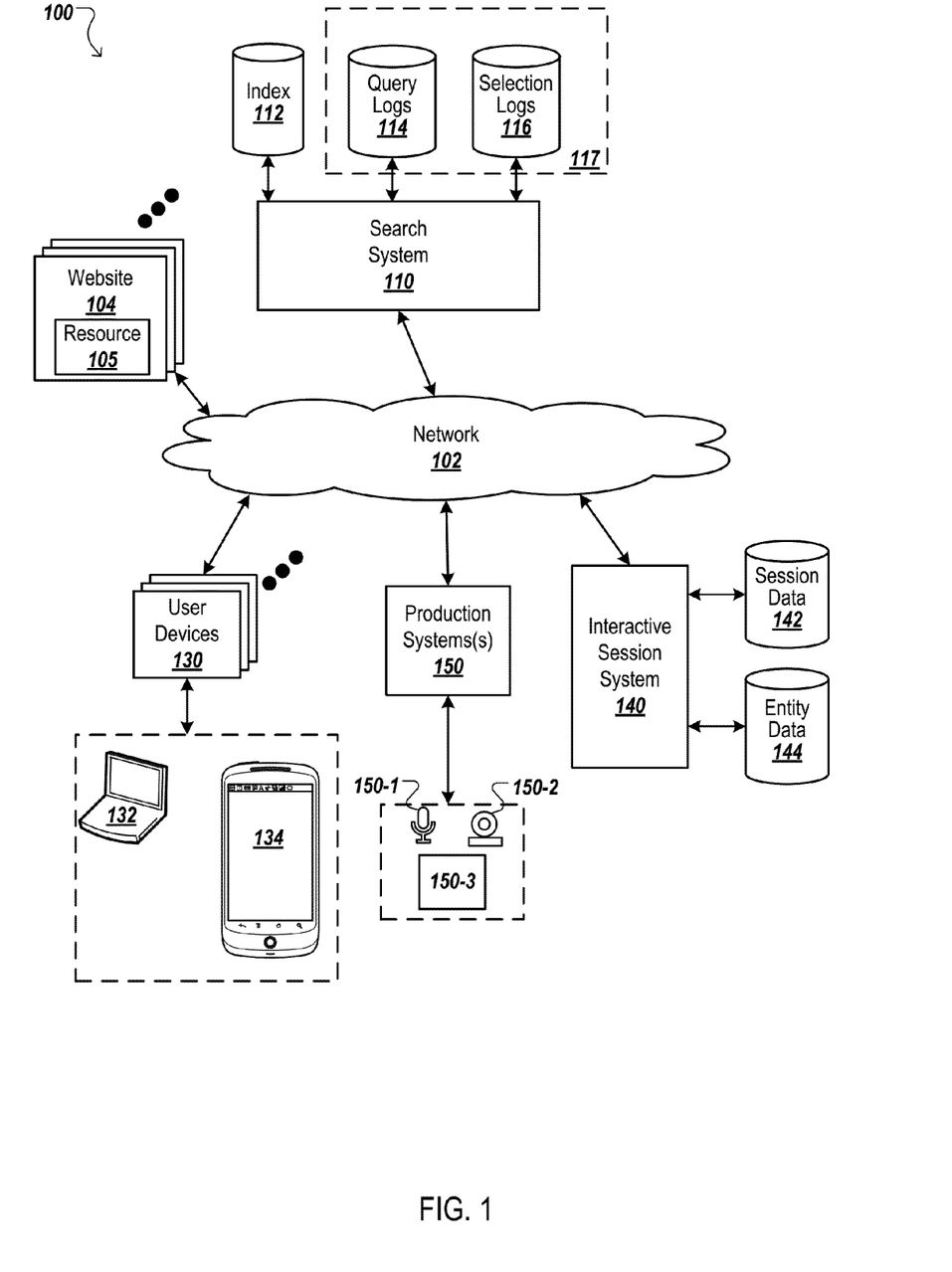
FIG. 1 is a block diagram of an example content distribution environment.

FIG. 1 is a block diagram of an example content distribution environment 100. A data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A website 104 includes one or more resources 105 associated with a domain and hosted by one or more servers in one or more locations. Generally, a website is a collection of web pages (or other resources) formatted in hypertext markup language (HTML) that can contain text, images, multimedia content, and programming elements, for example, scripts. Each website 104 is maintained by a content publisher, which is an entity that controls, manages and/or owns the website 104.

A resource 105 is data provided over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

In operation, a search system 110 crawls the web sites 104 and indexes the resources 105 provided by the web sites 104 in an index 112. The search system 110 can receive queries from user devices 130. In response to each query, the search system 110 searches the index 112 to identify resources and information that are relevant to the query. The search system 110 identifies the resources in the form of search results and returns the search results to the user device 130. A search result is data, generated by the search system 110, that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, e.g., information retrieval ("IR") scores, and optionally a separate ranking of each resource relative to other resources, e.g., an authority score. The search results are ordered according to these scores and provided to the user device according to the order. A user device 130 receives the search results and presents them to a user. If a user selects a search result, the user device 130 requests the resource that is referenced by the search result. For example, if a search result includes an active link to the web pages example.com, user interaction with this search result will cause the user device to request the resource located at example.com. The publisher of the web site 104 hosting the resource receives the request for the resource and provides the resource to the user device 130.

In some implementations, the queries submitted from user devices 130 are stored in query logs 114. Selection data for the queries and the web pages referenced by the search results and selected by users are stored in selection logs 116. The selection logs 116 represent actions taken responsive to search results provided by the search engine 110.

The query logs 114 and the selection logs 116 are examples of search history data 117. The search history data 117 include data from, and related to, previous search requests associated with unique identifiers. The search history data 117 can be used to map queries submitted by user devices to resources that were identified in search results and the actions taken by users when presented with the search results in response to the queries. In some implementations, data are associated with (e.g., indexed according to) the identifiers from the search requests so that a search history for each identifier can be accessed. The search history data 117 can thus be used by the search system to determine the respective sequences of queries submitted by user devices, the actions taken in response to the queries, and how often the queries have been submitted.

In situations in which the systems described here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A user device 130 is an electronic device, or collection of devices capable of requesting and receiving resources over the network 102. Example user devices 106 include personal computers 132, mobile communication devices 134, and other devices that can send and receive data over the network 102. A user device 130 typically includes a user application, e.g., a web browser, that sends and receives data over the network 102, generally in response to user actions. The web browser can enable a user to display and interact with text, images, videos, music and other information typically located on a web page at a website on the world wide web or a local area network.

An interactive session system 140 is also accessible by the user devices 130 over the network 102. The interactive session system 140 serves interactive sessions (also referred to as "sessions") and data related to interactive sessions to users of user devices 130. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents their intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may determine specific data to provide to a user based on the intent of the user. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials, professional registrations, or demonstrated a high level of skill with respect to a particular task category. Examples of expert assistants include a licensed contractor for construction related sessions, a company that produces sessions for a particular product the company manufactures, and a user that has produced a large number of highly rated sessions for a particular task category.

Production systems 150 can be used to create interactive sessions. Production systems 150 may range from studios to simple hand-held video and/or audio recording systems. Generally, a production system 150 is a system that includes one or more of an audio input device 150-1, a video input device 150-2, an optional display device 150-3, and optionally other input devices, output devices, and production processes that are used to create sessions. For example, post production processes may be used to add metadata to an interactive session. Such metadata may include, for example, keywords and topical information that can be used to classify the session to one or more topical categories; a list of tools and part required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

A session is stored as session data 142 and is associated with an authoring entity, or provider, by entity data 144. For example, session data 142 for a particular session can be stored with an identifier identifying the session and entity data 144 identifying the entity that is credited with authoring the session.

A user device 130 can access the interactive session system 140 to request an interactive session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

For example, in response to receiving a query from a user device 130, the search system 110 can identify one or more sessions that are deemed relevant to the query (e.g., based on a relevance score). Alternatively, or additionally, the search system 110 can interact with the interactive session system 140 to obtain data identifying one or more sessions that are deemed relevant to the query.

In response to the query, the search system 110 can provide a search result referencing the one or more sessions that were deemed relevant to the query and quality information specifying a measure of quality of the session based on quality feedback from other users. For example, the quality information can include a set of five stars, where the average user rating of the session is indicated by the portion of the five stars that are filled with color. When a user interacts with a search result that references a particular session, the user device will submit a request to the interactive session system 140 requesting the session data 142 for that particular session. In turn, the user can experience the requested session.

A user experiences a session by use of one or more user devices 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near real time. A real time or near real time interactive session can be an interactive session that is created in response to a user request for the interactive session. For example, real-time sessions may be provided by a company for repairing a product sold by the company when the user does not find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

When a user is considering whether to request presentation of a session related to a particular task and/or is interested in performing the particular task, the user may evaluate quality feedback about the interactive session in general, quality feedback about a person associated with the presentation of the interactive sessions, quality feedback about materials provided for the interactive session, or quality feedback about another person, place, or thing associated with the interactive session. Quality feedback is data received from users, and includes measures of quality and/or commentary related to a session.

Throughout this document, the term "entity" is used to generally refer to a person, place, or thing, such as an interactive session. This document will refer to evaluating and selecting interactive sessions for purposes of example, but the techniques and operations discussed throughout this document can be utilized in other environments. For example, these and other similar techniques and operations can be used in the context of evaluating and selecting products or services to be purchased.

When evaluating and/or selecting an interactive session based on quality feedback, a user may, for example, review a baseline quality score for the interactive session. A baseline quality score is a quality score determined based on a collection of quality scores received from users, and can be referred to as an overall quality score. An overall quality score can be, for example, an average (or another measure of central tendency) of the quality scores that other users have submitted with reference to the interactive session. For example, each user may be enabled to specify a number of stars, e.g., 1-5 stars, that represents the user's overall satisfaction and/or the measure of quality that the user associates with the interactive session. The overall quality score may provide a user with information about the quality of the interactive session from the perspective of users in general, but this overall quality score may not reflect the quality of the interactive session for any particular user.

For example, the reasons that individual users select the value of the quality score they submit will vary based on characteristics of the interactive session that are important to that particular user. However, the characteristics that are important to that particular user, or even a group of other users, may not be important to a second user that is evaluating the interactive session. Thus, the overall quality score, or other baseline quality scores, for an interactive session may not provide the second user with adequate information to effectively evaluate the quality of an interactive session based on the characteristics that are important to the second user.

For purposes of illustration, assume that an advanced yoga interactive session demonstrates yoga positions that are only taught by several expert yoga instructors worldwide. The price of this interactive session may be much higher than basic yoga interactive sessions that demonstrate more basic yoga positions. If the advanced yoga session is experienced by a group of beginner yoga students that are budget conscious, they may rate the interactive session very low, e.g., 1.0 out of 5.0 based solely on the price, which may lower the overall quality score for the interactive session.

Continuing with this example, assume that a particular user interested in the advanced yoga interactive session is not price sensitive and/or highly values the opportunity to be taught advanced yoga positions by one of the expert yoga instructors. This particular user will be unable to determine, based on the overall quality score, that other users' budget preferences are contributing negatively to the overall quality score for the advanced yoga interactive session. Thus, the particular user may not be able to effectively evaluate the quality of the advanced yoga interactive session based on the overall quality score, since the overall quality score does not account for the fact that the particular user is not price sensitive.

The particular user may review individual quality scores that were submitted by other users and/or feedback text that the other users submitted with their quality scores. For example, based on the individual quality scores and the feedback text, the particular user may be able to identify some reasons why other users submitted the various quality scores. However, this additional investigation is time consuming, and will not provide the particular user with a quality score that is personalized based on characteristics that are important to that particular user or the level of influence of the various characteristics on the overall quality score.

As used throughout this document, a characteristic of an interactive session (or entity) refers to a feature associated with the interactive session that helps distinguish the interactive session from other interactive sessions. Example characteristics include a duration of the interactive session, a speech rate of an entity that speaks in the interactive session, a level of expertise of an entity presenting content in the interactive session, and a price of the interactive session. The characteristics of a particular interactive session can be identified from user feedback, so any number or combination of characteristics can be associated with the particular interactive session.

The influence of a characteristic on a quality score or another value of quality refers to a change in the quality score that is attributable to the characteristic being present. For example, assume that an average quality score associated with a particular characteristic is higher than an average quality score associated with a different characteristic, and the average quality scores for both the characteristics are higher than an overall quality score for an interactive session. In this example, the influence of the particular characteristic can be considered higher than the influence of the different characteristic.

To facilitate personalized evaluation of interactive sessions, the interactive session system 140 estimates, for a user, a personalized quality score for interactive sessions. The personalized quality score can be estimated based on a measure of importance of one or more characteristics to the user and the influence of the one or more characteristics on a baseline quality score for the interactive session. As used throughout this document, the measure of importance of a characteristic to a user represents the importance of that characteristic for evaluating quality from the perspective of that user. For example, assume that a user specifies a measure of importance of 1.0 (on a scale from 1.0-10.0) for a first characteristic and a measure of importance of 10.0 for a second characteristic. In this example, the second characteristic is more important than the first characteristic for determining the quality of an interactive session from the perspective of the user. Therefore, for a particular entity, the influence of the second characteristic should be considered more important than the influence of the first characteristic for determining a personalized quality score for the user.

In some implementations, the measure of importance, to the user, of each characteristic can be specified using a characteristic weight, and the collection of characteristic weights associated with the user constitute a quality profile for the user. For example, assume that the characteristic weights are specified on a scale of 1.0 to 10.0, where 1.0 represents a lowest importance to the user and 10.0 represents a highest importance to the user. Also assume that price has a weight of 1.0, and timeliness (e.g., the interactive session beginning and ending on time) has a weight of 10.0. In this example, the quality profile for the user would include data specifying the weight of 1.0 for price, and the weight of 10.0 for timeliness.

As described in more detail below, the quality profile for a user can be determined based on quality feedback received from the user or explicitly specified by the user.

The interactive session system 140 can use this quality profile to determine an estimated quality score for the user. For example, as described in more detail below, the interactive session system 140 can adjust (e.g., increase or decrease) a baseline quality score (e.g., an average quality score) to account for the influence of the timeliness characteristic on the baseline quality score and to reflect the importance of timeliness to the user. Similarly, the interactive session system 140 can adjust the baseline quality score for an interactive score to account for the influence of the price characteristic on the baseline quality score and to reflect the lack of importance of price to the user.

The interactive session system 140 can determine the influence of a characteristic, such as price, on the baseline quality score for an interactive session (or another entity) based on quality feedback received from users. In some implementations, the interactive session system 140 can evaluate the quality scores received from the users and feedback text received from the users to determine the impact of a particular characteristic on the baseline quality score. For example, if the quality scores received with text that is associated with the price characteristic are determined to be one star lower than quality scores that are received without text that is associated with the price characteristic, the influence of price on the baseline quality score for an interactive session can be determined to be negative based on the identified differences in the quality scores.

Figure 2:
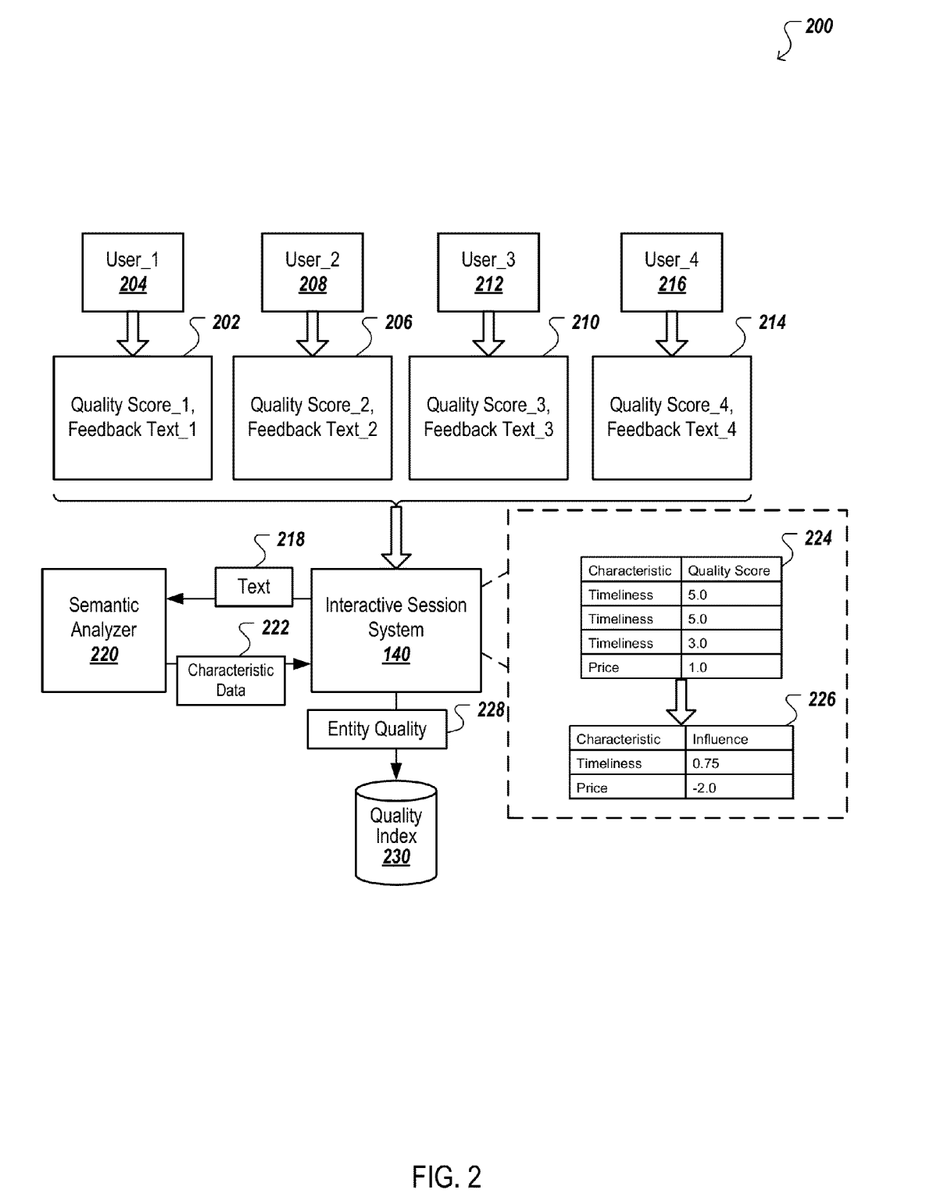
FIG. 2 is a block diagram illustrating an example data flow for determining the influence of characteristics on a baseline quality score.

In a similar manner, the influences of various characteristics on the baseline quality score can be determined, and then used in conjunction with the importance of the various characteristics to a particular user to generate an estimated quality score for the user. The interactive session system 140 will estimate the quality of the interactive session to the user, based on the user's preferences, and rank interactive sessions based on the estimated quality scores, thereby providing the user with a personalized ranking of interactive sessions. FIG. 2 is a block diagram illustrating an example data flow 200 for determining the influence of characteristics on a baseline quality score. The data flow 200 begins with the interactive session system 140 obtaining quality feedback submitted by multiple different users. In some implementations, each set of quality feedback can include a quality score and/or feedback text. For example, the quality feedback 202 received from User_1 204 includes Quality Score_1 and Feedback Text_1, the quality feedback 206 received from User_2 208 includes Quality Score_2 and Feedback Text_2, the quality feedback 210 received from User_3 212 includes Quality Score_3 and Feedback Text_3, and the quality feedback 214 received from User_4 216 includes Quality Score_4 and Feedback Text_4.

Each quality score can specify a measure of quality that the corresponding user has specified for the entity being rated. For example, assume that the entity being rated is a particular interactive session that has been experienced by each of User_1, User_2, User_3, and User_4. In this example, assume that User_1 and User_2 submitted a quality score of 5.0, which represents a highest measure of quality on a scale of 1.0-5.0. Further assume that User_3 submitted a quality score of 3.0, and that User_4 submitted a quality score of 1.0, which represents a lowest measure of quality on the scale ranging from 1.0-5.0. Additional quality scores can also be received from other users, and at least a portion of the collection of quality scores can be used to determine a baseline score for the entity.

The feedback text is text received from the user device and is associated with the quality score. The feedback text can be associated with the quality score, for example, by being received with the quality score, by being submitted though a same user interface as the quality score, or by including a reference to the quality score that was received from the user. The feedback text generally includes user comments regarding the entity being rated, which may provide guidance as to one or more reasons why a particular user submitted a particular quality score. For example, the quality feedback 214 received from User_4 216 may include text indicating that User_4 216 considered the interactive session overpriced, which may provide insight as to why User_4 216 submitted the quality score of 1, rather than a higher quality score.

In some implementations, the interactive session system 140 provides text 218, e.g., all or a proper subset of the received feedback text, to a semantic analyzer 220, which semantically analyzes the text, and provides a data related to a set of characteristics 222 that are referenced by the text 218. For example, the semantic analyzer 220 can evaluate the structure of the text 218, words used in the text 218, and the positions of the words in the text 218 to identify topics being referenced by the text 218. These topics can be classified as related to one or more characteristics of the interactive session. For example, the semantic analyzer 220 may determine that the text "the interactive session was overpriced," and the text "the price of the interactive session was too high," both refer to the price of the interactive session, and that both portions of text are negative expressions related to the price of the interactive session. In this example, the data related to the set of characteristics 222 provided in response to each of these portions of text can refer to the characteristic of "price" and also include data specifying the negative association with the characteristic "price."

The interactive session system 140 receives the data related to the one or more characteristics 222 and creates an association between the quality scores received from the users and the data related to the one or more characteristics. An example association is presented in table 224, which includes a column identifying the characteristic referenced by the text 218 and the quality score.

In some implementations, the data in the table 224 can be used to determine the influence of a characteristic on the quality score for an interactive session. The influence of a characteristic on the quality score for an interactive session (or another entity) can be based, for example, on a difference between quality scores associated with the characteristic and quality scores that are not associated with the characteristic.

For example, the influence of the timeliness characteristic on the quality score for an entity can be quantified based on a difference between the average of the quality scores associated with timeliness (e.g., quality scores that are received with feedback text referencing timeliness) and an average of the quality scores that are not associated with timeliness (e.g., quality scores that are received without feedback text that references timeliness). To illustrate, assume that the average of the quality scores that are not associated with timeliness is 4.0, and that the average of the quality scores that are associated with timeliness is 4.75. In this example, the influence of timeliness can be set to 0.75 (e.g., 4.75-4.0), and considered a positive influence on the quality score.

In another example, the influence of the price characteristic on the quality score can be quantified based on a difference between the average of the quality scores associated with price (e.g., quality scores that are received with feedback text referencing price) and an average of the quality scores that are not associated with price (e.g., quality scores that are received without feedback text that references price). To illustrate, assume that the average of the quality scores that are not associated with price is 4.5, and that the average of the quality scores that are associated with price is 2.0. In this example, the influence of price can be set to −2.5 (e.g., 2.0-4.5), and considered a negative influence on the quality score.

Values representing the influence of the various characteristics (e.g., the magnitude of the influence) can be associated with the corresponding characteristic. For example, the values and the corresponding characteristics can be used to generate a characteristic influence table 226. The characteristic influence table, or other data representing the influence of various characteristics on quality scores, can be stored as entity quality data 228 in a quality index 230. As described in more detail below, the interactive session system 140 can access the quality index to determine the influence of one or more characteristics on the quality score for an entity, and use that influence in combination with the quality profile of a user to determine an estimated quality score for the user.

As discussed above, the quality profile of a user includes one or more measures of importance of characteristics for evaluating quality from the user's perspective. For example, if a user is not price sensitive but finds timeliness very important, the user's importance profile may include measure of importance for timeliness that exceeds the measure of importance for price. In some implementations, the user's quality profile may be learned based on the quality feedback submitted by the user. The measures of importance can be determined in a manner similar to that described above using the feedback text and quality scores that were previously submitted by the user. For example, the measure of importance for a particular characteristic (e.g., timeliness) can be determined based on the difference between the average (or another measure) of the quality scores associated with the characteristic and the average (or another measure) of the quality scores that were not associated with the characteristic.

In some implementations, a user is enabled to create or edit their quality profile. For example, a user can be provided a user interface through which the user can explicitly specify the importance of one or more characteristics for evaluating the quality of an entity from the user's perspective.

Figure 3:
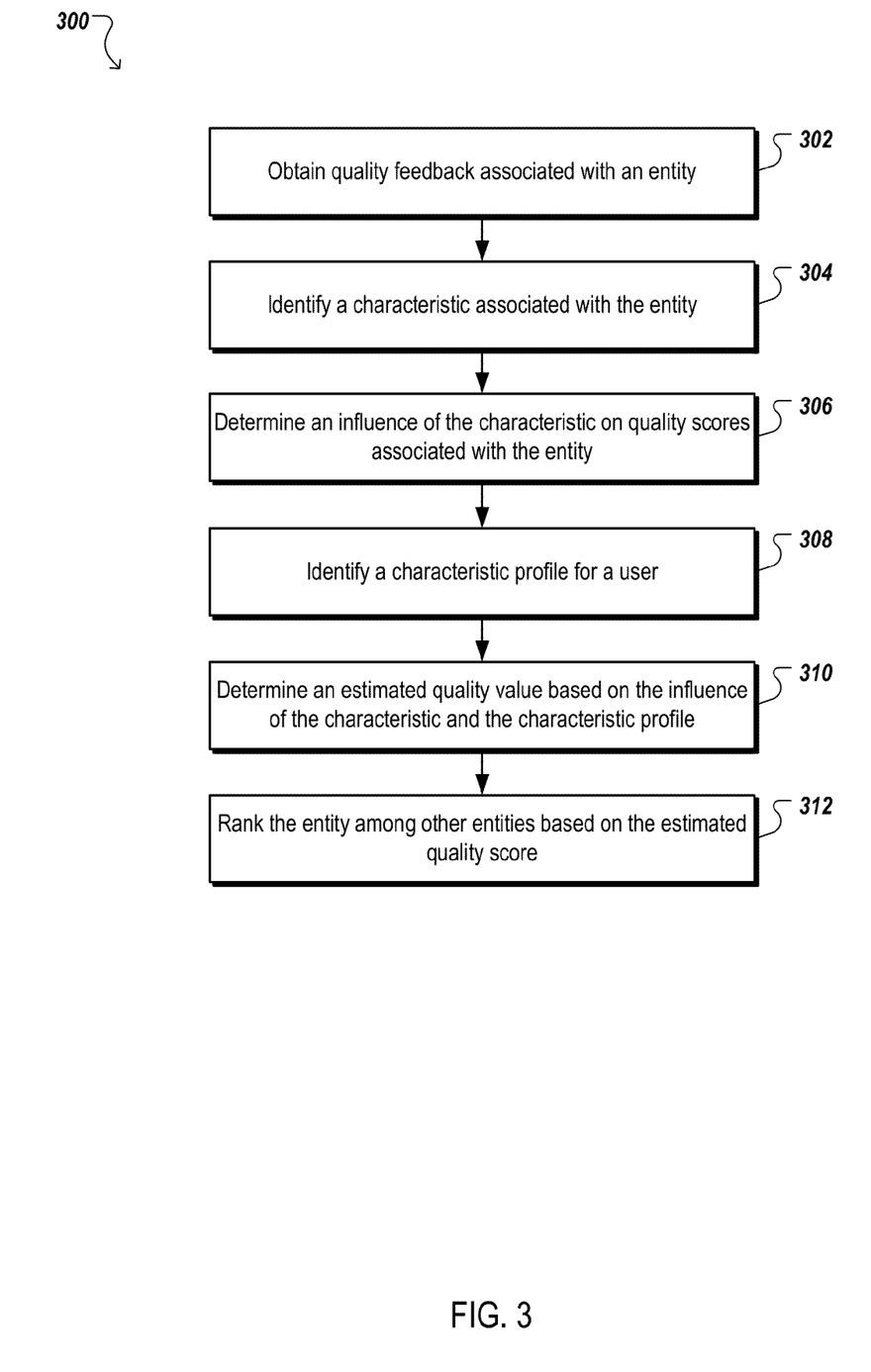
FIG. 3 is a flow chart of an example process for determining an estimated quality score for an entity.

FIG. 3 is a flow chart of an example process 300 for determining an estimated quality score for an entity. The process 300 can be performed, for example, by one or more of the interactive session system 140, the search system 110, and/or another data processing apparatus. The process 300 can also be implemented as instructions stored on computer storage medium. Execution of the instructions by a data processing apparatus can cause the data processing apparatus to perform the operations of the process 300.

Quality feedback associated with an entity is obtained (302). In some implementations, the quality feedback includes quality scores representing measures of quality that were associated with the entity by users. For example, a user that has experienced an interactive user session can submit a quality score representing the level of quality of the interactive session from the perspective of that user. As described above, the quality scores from multiple different users can be used to determine a baseline quality score (e.g., an average quality score).

The quality feedback can also include feedback text. For example, a user interface through which a user submits a quality score can include a text box, or another feedback interface, that enables the user to submit text comments to be associated with their quality score. The user's text comments may include, for example, information related to why the user submitted the quality score that they submitted. For example, if the user was dissatisfied with the content of the interactive session, they may indicate as much in the feedback text. Similarly, if the user thought that the cost of the interactive session was too high, the user may submit feedback text referencing their dissatisfaction with the price of the interactive session.

A characteristic associated with the entity is identified (304). In some implementations, the characteristic is identified based on entity quality data for the entity. As discussed above with reference to FIG. 2, the entity quality data can include, for example, characteristics of the entity that were referenced in the feedback text. For example, the entity quality data can include data specifying that the feedback text included references to price, timeliness, content quality, or other characteristics associated with the entity. The entity quality data can be obtained, for example, from a quality index or another data store. In some implementations, the characteristic can be identified directly from the feedback text, from a characteristic influence table, or from other data specifying one or more characteristics that have been associated with the entity.

An influence of the characteristic on quality scores associated with the entity is determined (306). In some implementations, the influence of the characteristic is specified by the entity quality data that are obtained from the quality index. In some implementations, the influence is determined based on the quality scores. For example, as discussed above with reference to FIG. 2, the influence of a particular characteristic can be determined, for example, based on a difference between first quality scores received with text referencing the particular characteristic and second quality scores received without text referencing the particular characteristic. In some implementations, the influence of the characteristic can be obtained from the characteristic influence table.

A quality profile is identified for a user (308). In some implementations, the quality profile of a user includes one or more measures of importance of characteristics. The measure of importance for a particular characteristic represents the importance of the particular characteristic for evaluating quality of an entity from the perspective of the user. For example, if the quality profile for a user specifies a characteristic weight for price that is higher than the characteristic weight specified for timeliness, price is a more important characteristic for that user than timeliness.

In some implementations, the quality profile is provided by the user. For example, the user can submit the characteristic weights for one or more different characteristics, and the characteristic weights will constitute a user-specified quality profile for that user. The user-specified quality profile can be stored in a data store and accessed as needed to evaluate the quality of entities from the perspective of the user.

In some implementations, the quality profile of the user is determined, or inferred, from previous quality feedback that has been previously received from the user. For example, the previous quality feedback can be obtained from a data store that stores quality feedback data, and a characteristic referenced by feedback text in the previous quality feedback can be identified. The quality scores that the user submitted with the feedback text can be identified from the quality feedback, and the characteristic weight for a particular characteristic can be determined based on the quality scores.

For example, the quality scores that were received with feedback text referencing the particular characteristic can be used to generate an average quality score (or another measure of the quality scores) corresponding to the particular characteristic. Similarly, the quality scores that were received without feedback text or were received with feedback text that does not reference the particular characteristic can be used to generate an average quality score (or another measure of the quality scores) that is independent of the particular characteristic. The characteristic weight for the particular characteristic can be determined based on the quality score corresponding to the particular characteristic and the quality score that is independent of the characteristic. For example, the characteristic weight can be based on a difference between the quality score corresponding to the particular characteristic and the quality score that is independent of the characteristic. Characteristic weights can be similarly determined for other characteristics and the set of characteristic weights can be used to generate the quality profile for the user.

An estimated quality score is determined based on the influence of the characteristic and the quality profile for the user (310). In some implementations, the estimated quality score is determined, at least in part, by adjusting a baseline quality score for the entity based on the quality profile for the user. For example, assume that the quality profile for a particular user indicates that, on a scale from 1.0-10.0, price is associated with a characteristic weight of 1.0. Further assume that price has been determined to have a negative effect on the baseline quality score for the entity. In this example, the estimated quality score can be obtained by reducing the negative effect of price on the baseline quality score for the entity. For example, since the quality profile for the user indicates that price is of little to no value when evaluating quality from the perspective of the user, the baseline quality score for the entity can be increased to negate the full negative influence of price on the baseline quality score. The increased baseline quality score can be identified as the estimated quality score, or personalized quality score, for the user.

In some implementations, the amount by which the baseline quality score is adjusted can be based on a function of the characteristic weight specified by the quality profile of the user and the influence of the characteristic on the quality score. For example, the adjustment to the baseline quality score can be inversely proportional to the importance measure. For purposes of illustration, assume that the influence of price is −2.0, and that the quality profile for the user specifies a characteristic weight of 1.0 for price, meaning that price is of little importance for determining quality from the perspective of the user. In this example, the baseline quality score can be increased by 2.0 (e.g., 2.0/1.0) to obtain the estimated quality score for the user. If, however, price was associated with a characteristic weight of 10.0 in the quality profile, the adjustment to the baseline quality score would only be 0.2 (e.g., 2.0/10.0) in this example. In another example, assume that the influence of timeliness is +0.75, and that the quality profile for the user specifies a weight of 8.0 for timeliness. In this example, the amount by which the quality score is decreased can be 0.09375 (e.g., 0.75/8.0) to account for the influence of timeliness on the baseline quality score.

The functions and values are provided for purposes of example only. Other functions, values, and adjustment techniques can be used to generate a personalized quality score that quantifies quality from the perspective of the user (e.g., based on the importance of particular characteristics to the user and/or the influence of those characteristics on the baseline quality score).

The entity is ranked among other entities based on the estimated quality score (312). In some implementations, the entities are ranked in descending order of estimated quality score.

Figure 4:
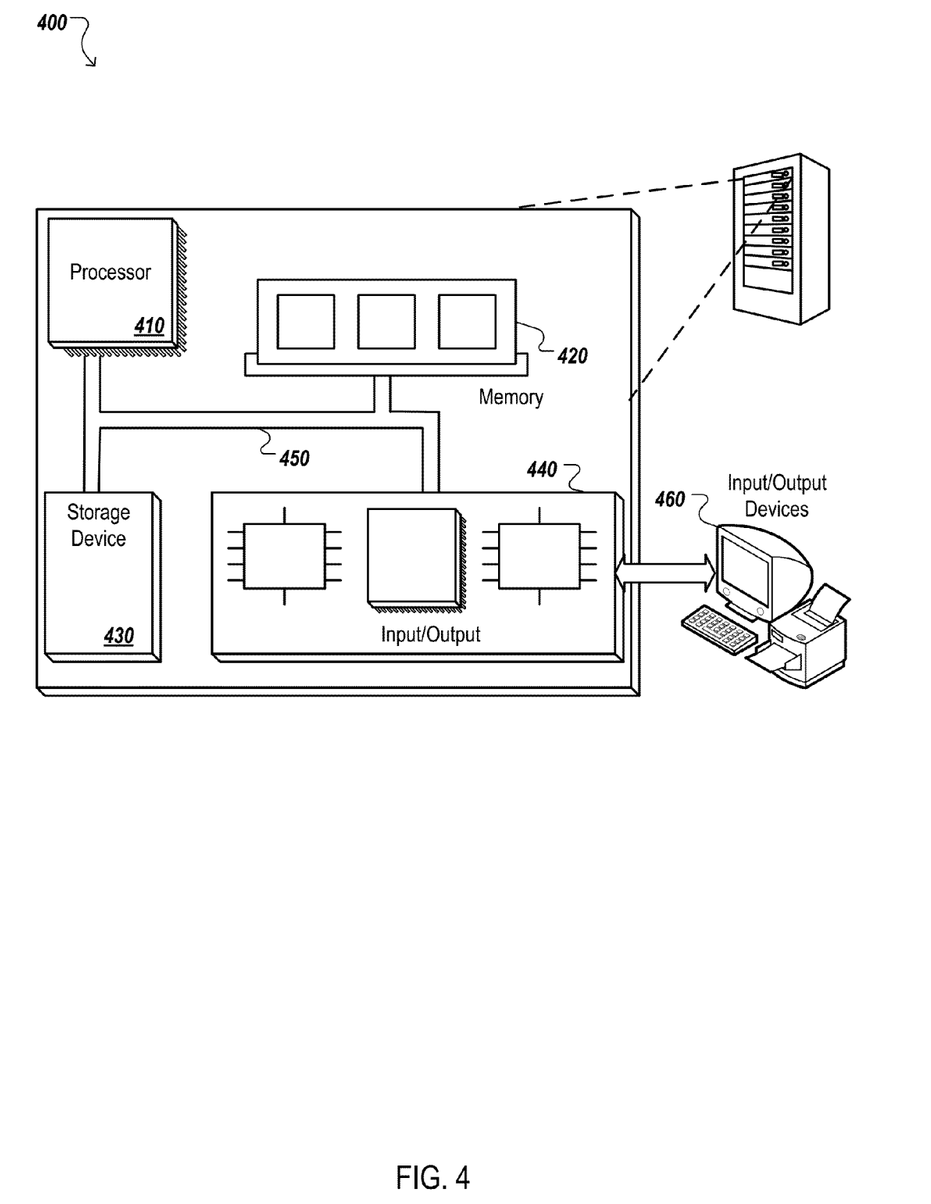
FIG. 4 is a block diagram of an example data processing apparatus.

FIG. 4 is a block diagram of an example data processing apparatus 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining, for a product or service, quality feedback including multiple different quality scores representing different measures of quality that have been assigned to the product or service by multiple different users, the quality feedback including feedback text submitted by the multiple different users with the quality scores;
    identifying, from the feedback text, a characteristic, of the product or service, that has been referenced in the feedback text submitted by the multiple different users;
    determining, by a data processing apparatus, an amount of influence of the characteristic on the quality scores that were submitted with the feedback text based on a difference between a first aggregate value of the quality scores that were submitted without feedback text identifying the characteristic relative to a second aggregate value of the quality scores that were submitted with feedback text identifying the characteristic, wherein the amount of influence corresponds to differences in quality scores that are attributable to the characteristic;
    identifying, for a given user, a quality profile specifying a characteristic weight that is a measure of importance of the characteristic to the given user;
    determining, by a data processing apparatus and for the given user, a personalized estimated quality value for the product or service, including adjusting an overall quality score for the product or service based on the influence of the characteristic on the quality scores based on the characteristic weight for the given user; and
    ranking, by a data processing apparatus and for the given user, the product or service among other products or services based on the personalized estimated quality score.

2. The method of claim 1, wherein:
    obtaining quality feedback comprises obtaining, from each of the multiple different users that have experienced an interactive session, a quality score for the interactive session and feedback text including comments supplied by the multiple different users;
    identifying a characteristic of the entity comprises identifying a topic referenced by feedback text submitted by one or more of the multiple different users; and
    identifying a quality profile comprises:
        identifying user quality feedback previously received from the given user; and
        determining, based on the user quality feedback, a difference between quality scores that were associated with the characteristic and quality scores that were not associated with the characteristic.

3. The method of claim 1, wherein identifying a quality profile for the given user comprises:
    obtaining previous quality feedback previously received from the given user;
    identifying a characteristic referenced by feedback text in the previous quality feedback received from the given user;
    identifying first quality scores that were received in a portion of the previous quality feedback that includes the feedback text that references the characteristic;
    identifying second quality scores that were received in a portion of the previous quality feedback that does not include the feedback text that references the characteristic; and
    determining the characteristic weight for the given user based on a difference between the first quality scores and the second quality scores.

4. The method of claim 3, comprising generating the quality profile based on the characteristic weight of the characteristic for the given user and at least one additional characteristic weight of at least one additional characteristic for the given user.

5. The method of claim 1, wherein identifying a quality profile comprises identifying a user-specified measure of importance of the characteristic.

6. The method of claim 1, wherein determining, for the given user, a personalized estimated quality score for the product or service based on the influence of the characteristic on the quality scores and the characteristic weight for the given user comprises:
    determining that the characteristic weight for the given user indicates that the characteristic is important to the given user;
    determining that the influence of the characteristic on the quality scores is a positive influence; and
    increasing a baseline quality score for the product or service based, at least in part, on a magnitude of the positive influence.

7. A non-transitory computer storage medium encoded with a computer program, the program comprising instructions that when executed by data processing apparatus cause the data processing apparatus to perform operations comprising:
    obtaining, for a product or service, quality feedback including multiple different quality scores representing different measures of quality that have been assigned to the product or service by multiple different users, the quality feedback including feedback text submitted by the multiple different users with the quality scores;
    identifying, from the feedback text, a characteristic, of the product or service, that has been referenced in the feedback text submitted by the multiple different users;
    determining an amount of influence of the characteristic on the quality scores that were submitted with the feedback text based on a difference between a first aggregate value of the quality scores that were submitted without feedback text identifying the characteristic relative to a second aggregate value of the quality scores that were submitted with feedback text identifying the characteristic, wherein the amount of influence corresponds to differences in quality scores that are attributable to the characteristic;

identifying, for a given user, a quality profile specifying a characteristic weight that is a measure of importance of the characteristic to the given user;

determining, for the given user, a personalized estimated quality value for the product or service, including adjusting an overall quality score for the product or service based on the influence of the characteristic on the quality scores based on the characteristic weight for the given user; and ranking, for the given user, the product or service among other products or services based on the estimated quality score.

8. The computer storage medium of claim 7, wherein identifying a quality profile for the given user comprises:

obtaining previous quality feedback previously received from the given user;

identifying a characteristic referenced by feedback text in the previous quality feedback received from the given user;

identifying first quality scores that were received in a portion of the previous quality feedback that includes the feedback text that references the characteristic;

identifying second quality scores that were received in a portion of the previous quality feedback that does not include the feedback text that references the characteristic; and determining the characteristic weight for the given user based on a difference between the first quality scores and the second quality scores.

9. The computer storage medium of claim 8, wherein the instructions cause the data processing apparatus to perform operations comprising generating the quality profile based on the characteristic weight of the characteristic for the given user and at least one additional characteristic weight of at least one additional characteristic for the given user.

10. The computer storage medium of claim 7, wherein identifying a quality profile comprises identifying a user-specified measure of importance of the characteristic.

11. The computer storage medium of claim 7, wherein determining, for the given user, a personalized estimated quality score for the product or service based on the influence of the characteristic on the quality scores and the characteristic weight for the given user comprises:

determining that the characteristic weight for the given user indicates that the characteristic is important to the given user;

determining that the influence of the characteristic on the quality scores is a positive influence; and increasing a baseline quality score for the product or service based, at least in part, on a magnitude of the positive influence.

12. A system comprising:

a data store storing quality feedback, for one or more different entities, the quality feedback including quality scores representing measures of quality for the entity and including feedback text submitted with the quality scores; and one or more computers that execute instructions that cause the one or more computers to interact with the device and to perform operations comprising:

obtaining, for a product or service and from the data store, quality feedback including multiple different quality scores representing different measures of quality that have been assigned to the product or service by multiple different users, the quality feedback including feedback text submitted by the multiple different users with the quality scores;

identifying, from the feedback text, a characteristic, of the product or service, that has been referenced in the feedback text submitted by the multiple different users;

determining an amount of influence of the characteristic on the quality scores that were submitted with the feedback text based on a difference between a first aggregate value of the quality scores that were submitted without feedback text identifying the characteristic relative to a second aggregate value of the quality scores that were submitted with feedback text identifying the characteristic, wherein the amount of influence corresponds to differences in quality scores that are attributable to the characteristic;

identifying, for a given user, a quality profile specifying a characteristic weight that is a measure of importance of the characteristic to the given user;

determining, for the given user, a personalized estimated quality value for the product or service, including adjusting an overall quality score for the product or service based on the influence of the characteristic on the quality scores based on the characteristic weight for the given user; and ranking, for the given user, the product or service among other products or services based on the estimated quality score.

13. The system of claim 12, wherein:

obtaining quality feedback comprises obtaining, from each of the multiple different users that have experienced an interactive session, a quality score for the interactive session and feedback text including comments supplied by the multiple different users;

identifying a characteristic of the entity comprises identifying a topic referenced by feedback text submitted by one or more of the multiple different users; and identifying a quality profile comprises:

identifying user quality feedback previously received from the given user; and determining, based on the user quality feedback, a difference between quality scores that were associated with the characteristic and quality scores that were not associated with the characteristic.

14. The system of claim 12, wherein identifying a quality profile for the given user comprises:

obtaining previous quality feedback previously received from the given user;

identifying a characteristic referenced by feedback text in the previous quality feedback received from the given user;

identifying first quality scores that were received in a portion of the previous quality feedback that includes the feedback text that references the characteristic;

identifying second quality scores that were received in a portion of the previous quality feedback that does not include the feedback text that references the characteristic; and determining the characteristic weight for the given user based on a difference between the first quality scores and the second quality scores.

15. The system of claim 14, wherein the instructions cause the one or more computers to perform operations comprising generating the quality profile based on the characteristic weight of the characteristic for the given user and at least one additional characteristic weight of at least one additional characteristic for the given user.

16. The system of claim 12, wherein identifying a quality profile comprises identifying a user-specified measure of importance of the characteristic.

17. The system of claim 12, wherein determining, for the given user, a personalized estimated quality score for the product or service based on the influence of the characteristic on the quality scores and the characteristic weight for the given user comprises:
- determining that the characteristic weight for the given user indicates that the characteristic is important to the given user;
- determining that the influence of the characteristic on the quality scores is a positive influence; and
- increasing a baseline quality score for the product or service based, at least in part, on a magnitude of the positive influence.

* * * * *